United States Patent [19]

Brugel

[11] Patent Number: 5,194,505

[45] Date of Patent: Mar. 16, 1993

[54] CHLOROSULFONATED POLYOLEFIN-MODIFIED POLYURETHANE AND POLYUREA COMPOSITIONS AND PROCESS FOR MAKING SAME

[75] Inventor: Edward G. Brugel, Wilmington, Del.

[73] Assignee: E. I. Du Pont de Nemours and Company, Wilmington, Del.

[21] Appl. No.: 789,686

[22] Filed: Nov. 8, 1991

Related U.S. Application Data

[63] Continuation-in-part of Ser. No. 415,163, Sep. 29, 1989, abandoned.

[51] Int. Cl.$^5$ .................. C08F 8/20; C08F 259/02; C08F 273/00; C08L 75/00
[52] U.S. Cl. .................. 525/131; 525/291; 525/292; 525/293
[58] Field of Search .............. 525/131, 291, 292, 293

[56] References Cited

U.S. PATENT DOCUMENTS

| | | | |
|---|---|---|---|
| 2,615,000 | 10/1952 | Bradley | 260/31.2 |
| 2,723,255 | 11/1955 | Busse et al. | 260/79.3 |
| 2,852,497 | 9/1958 | Thompson | 260/79.3 |
| 3,594,449 | 7/1971 | Binder | 525/131 |
| 4,261,946 | 4/1981 | Goyert et al. | 525/131 |
| 4,342,847 | 8/1982 | Goyert et al. | 525/131 |
| 4,424,306 | 1/1984 | Kitahara et al. | 525/131 |
| 4,461,795 | 7/1984 | Ogawa | 428/339 |
| 4,868,029 | 9/1989 | Nakagawa et al. | 525/332.8 |
| 4,877,829 | 10/1989 | Vu et al. | 525/130 |
| 4,897,451 | 1/1990 | Nakagawa et al. | 525/194 |

FOREIGN PATENT DOCUMENTS

| | | | |
|---|---|---|---|
| 0042632 | 3/1983 | Japan | 525/131 |
| 61-83216 | 4/1986 | Japan . | |
| 1190530 | 8/1986 | Japan | 525/131 |

*Primary Examiner*—James J. Seidleck
*Assistant Examiner*—Thomas Hamilton, III
*Attorney, Agent, or Firm*—Marilyn H. Bromels

[57] ABSTRACT

A chlorosulfonated olefin polymer resin composition comprising the reaction product of:

a) 1-80% by weight, based on the weight of the resin, of a chlorosulfonated olefin polymer having a chlorine content of about 20-60% by weight and a sulfur content of about 0.5-10% by weight;

b) 5-90% by weight, based on the weight of the resin, of a compound selected from the group consisting of polyols, hydrocarbon primary and secondary polyamines, condensation products of said polyamines with aliphatic, cycloaliphatic, or aromatic polycarboxylic acids, and mixtures thereof, wherein the equivalent ratio of the compound to sulfur in the chlorosulfonated olefin polymer is greater than 1:1 and the compound has an equivalent weight up to 5,000; and c) at least 5% by weight, based on the weight of the resin, of a polyisocyanate;

is disclosed as well as the process for making same.

12 Claims, No Drawings

5,194,505

CHLOROSULFONATED POLYOLEFIN-MODIFIED POLYURETHANE AND POLYUREA COMPOSITIONS AND PROCESS FOR MAKING SAME

This is a continuation-in-part of application Ser. No. 07/415,163 filed Sep. 29, 1989, now abandoned.

BACKGROUND OF THE INVENTION

This invention relates to novel polyurethane and polyurea resin compositions containing chlorosulfonated olefin polymer blocks.

Polyurethane resins have found widespread application in the manufacture of articles that must be tough, abrasion-resistant, and which must exhibit some degree of flexibility. However, the degradation which results when the resins are exposed to various environments has limited their usefulness. Chlorosulfonated polyolefins are widely known and widely used elastomers which exhibit excellent resistance to acids, bases, and solvents. They also exhibit a high degree of flexibility, ozone resistance, and general overall weatherability as well as reduced surface tension. These properties are derived from the presence of chlorine on the polymer backbone. It would be impractical to chlorinate polyurethanes or polyureas to try to improve their properties. However, it has now been found that when chlorosulfonated polyolefins are reacted with polyols and/or polyamines and the resultant intermediate is further reacted with polyisocyanates, polyurethane or polyurea resins are obtained which exhibit improvements in chemical resistance, flexibililty, water resistance and overall weathering while still retaining the desirable properties of polyurethanes and polyureas.

SUMMARY OF THE INVENTION

This invention is directed to cured polyurethane or polyurea resin compositions having chlorosulfonated polyolefin blocks incorporated therein and to a process for preparing said resin compositions.

More specifically this invention is directed to a substantially hydrophobic chlorosulfonated olefin polymer resin composition comprising the reaction product of:
a) 10-80 % by weight, based on the weight of the resin, of a chlorosulfonated olefin polymer having a chlorine content of about 20-60% by weight and a sulfur content of about 0.5-10% by weight;
b) 5-90% by weight, based on the weight of the resin, of a compound selected from the group consisting of polyols, hydrocarbon primary or secondary polyamines, condensation products of said polyamines with aliphatic, cycloaliphatic, or aromatic polycarboxylic acids, and mixtures thereof, wherein the equivalent ratio of the compound to sulfur in the chlorosulfonated olefin polymer is greater than 1:1 and the compound has an equivalent weight up to 5,000; and
c) at least 5 % by weight, based on the weight of the resin, of a polyisocyanate.

In addition the invention is directed to a process for preparing the above-described substantially hydrophobic chlorosulfonated olefin polymer resin compositions which comprises contacting:
a) 10-80 % by weight, based on the total weight of the composition, of a chlorosulfonated olefin polymer having a chlorine content of about 20-60% by weight and a sulfur content of about 0.5-10% by weight with
b) 5-90% by weight, based on the total weight of the composition, of a compound selected from the group consisting of polyols, hydrocarbon primary or secondary polyamines, condensation products of said polyamines with aliphatic, cycloaliphatic, or aromatic polycarboxylic acids, and mixtures thereof, wherein the equivalent ratio of the compound to sulfur in the chlorosulfonated olefin polymer is greater than 1:1 and the compound has an equivalent weight up to 5,000; and with
c) at least 5 % by weight, based on the weight of the total composition, of a polyisocyanate;
with the proviso that when b) is a polyol alone, 0.1-2 equivalents, per equivalent of sulfur present in the chlorosulfonated olefin polymer, of a tertiary amine is additionally present.

In the above embodiment of the process of this invention the reactants are each present at the initiation of the reaction. In another embodiment of the invention, the chlorosulfonated olefin polymer and the polyol, polyamine, or mixture thereof may be pre-reacted to form a sulfonate or sulfonamide intermediate which is subsequently reacted with the polyisocyanate. When a polyol alone, and not a mixture of polyol and polyamine, is present as a reactant in this embodiment a tertiary amine is present in the pre-reaction mixture in an amount of 0.1-2 equivalents per equivalent of sulfur present in the chlorosulfonated polyolefin resin. When a polyamine or mixture of polyol and polyamine is present in this embodiment, the use of a tertiary amine is optional.

In another embodiment of the invention a partially sulfonated or sulfonamidated chlorosulfonated olefin polymer derivative is formed by pre-reaction of a chlorosulfonated olefin polymer in which a portion of the reactive sulfonyl chloride groups of the chlorosulfonated olefin polymer have been derivatized or pre-reacted with a compound selected from the group consisting of monohydric alcohols and primary or secondary amines. The resultant partially sulfonated or sulfonamidated chlorosulfonated olefin polymer is subsequently contacted with the polyol, polyamine or mixtures thereof and the polyisocyanate to form a polyurethane or polyurea resin of the invention. The amount of derivatizing agent may range from about 0.1 to about 1 equivalents, per equivalent of sulfur present in the chlorosulfonated olefin polymer. Use of monohydric alcohols in excess, to act as both solvent and reactant, is also contemplated by the invention. Under such circumstances, wherein more than one equivalent of monohydric alcohol derivatizing agent is present per equivalent of sulfur in the chlorosulfonated polyolefin, the final reaction with polyol or polyamine and isocyanate is a transesterification or a transamidation. When using polyols alone rather than polyol/polyamine mixtures in this embodiment, a tertiary amine is present in amounts of 0.1-2 equivalents per equivalent of sulfur present in the chlorosulfonated polyolefin resin. The use of tertiary amines is optional when polyamines or polyamine/polyol mixtures are used.

Chlorosulfonated resin compositions are thus produced which are cured polyurethane or polyurea resins. These novel polyurethane or polyurea resin compositions have improved physical and chemical properties which are imparted to them by incorporation of chlorosulfonated olefin polymers into the final resin product by first reacting the sulfonyl chloride moieties on the chlorosulfonated olefin polymers with an excess of a polyhydroxylic or polyamino compound or mixture thereof, followed by reaction of the hydroxyl or amino group or groups remaining after the initial reaction with polyisocyanate. Depending on the particular chlorosulfonated polymer chosen and its amount relative to the urethane or urea components the chlorine content varies, thus influencing the final properties of chlorine-containing polyurethane or polyurea compositions of this invention. Use of chlorosulfonated polyolefins containing low levels of chlorine, about 30-35 weight %, produces rubbery, non-crystalline blocks which can increase the toughness, elongation, and flexibility of the cured urethane or urea product. Higher chlorine levels, about 50-60 weight %, increase the glass transition temperature of the chlorosulfonated olefin polymer block, thus increasing the hardness and the barrier properties of the final cured polyurethane or polyurea. Incorporation of the chlorosulfonated olefin polymer into the resin means that the polymer is chemically a part of the polyurethane or polyurea structure. As such the polymer forms a block or blocks in the structure, in the same manner as do the urethane resin components (derived from polyisocyanate and polyol) or urea components (derived from polyisocyanate and polyamine). The polyisocyanate and polyol or polyamine blocks correspond to the residues of these components after reaction to form the polyurethane or polyurea as the case may be. Thus, the resin compositions of the present invention are cured polyurethane or polyurea resin compositions having chlorosulfonated olefin polymers incorporated therein through sulfonate or sulfonamide linkages.

DETAILED DESCRIPTION OF THE INVENTION

The substantially hydrophobic urethane or urea resin compositions of the invention comprise blocks derived from chlorosulfonated olefin polymer, blocks derived from either (a) polyol to form a polyurethane resin or (b) polyamine to form a polyurea resin, and blocks derived from polyisocyanate. Said resins contain 10-80% by weight, based on the weight of the resin, of chlorosulfonated olefin polymer-derived blocks linked via sulfonate ester or sulfonamide groups, the polyol or polyamine-derived blocks comprising 5-90% by weight, based on the weight of the resin, and the polyisocyanate-derived blocks comprising at least 5% by weight, based on the weight of the resin. They are thus cured or crosslinked compositions.

The excellent weatherability of the chlorosulfonated resin compositions of the present invention depends to a large extent upon the fact that the compositions are substantially hydrophobic. By the term substantially hydrophobic is meant that 5 mil thick films of the compositions will absorb less than about 10% by weight of water after immersion for 24 hours in distilled water at 25° C.

The term chlorosulfonated olefin polymer as used herein means those chlorosulfonated olefin polymers which contain chlorine in amounts ranging from 20-60 weight % and sulfur in amounts ranging from 0.5-10 weight %, based on the weight of the chlorosulfonated olefin polymer. The chlorosulfonated olefin polymers may be selected from the group consisting of chlorosulfonated homopolymers of $C_2$-$C_8$ alpha monoolefins, chlorosulfonated copolymers of ethylene and carbon monoxide, and chlorosulfonated copolymers of ethylene and at least one ethylenically unsaturated monomer selected from the group consisting of $C_3$-$C_{10}$ alpha monoolefins, $C_1$-$C_{12}$ alkyl esters of unsaturated $C_3$-$C_{20}$ monocarboxylic acids, unsaturated $C_3$-$C_{20}$ mono-or dicarboxylic acids, and vinyl esters of saturated $C_2$-$C_{18}$ carboxylic acids. These chlorosulfonated olefin polymers include chlorosulfonated polyethylene, chlorosulfonated polypropylene, chlorosulfonated ethylene/vinyl acetate copolymers, chlorosulfonated ethylene acrylic acid copolymers, chlorosulfonated ethylene methacrylic acid copolymers, chlorosulfonated ethylene methyl acrylate copolymers, chlorosulfonated ethylene methyl methacrylate copolymers, chlorosulfonated ethylene n-butyl methacrylate copolymers, chlorosulfonated ethylene glycidyl methacrylate copolymers, and chlorosulfonated copolymers of ethylene with propylene, butene, 3-methyl-1-pentene, or octene. Preferred chlorosulfonated olefin polymers are chlorosulfonated polyethylene and chlorosulfonated copolymers of ethylene and vinyl acetate.

The chlorosulfonated olefin polymers have average molecular weights within the range of 1,000 to 300,000. Those chlorosulfonated olefin polymers having average molecular weights of 1,000-50,000 are suitable for preparation of polyurethanes or polyureas for high solids coating applications, with the preferred average molecular weight being 5,000 to 10,000. Chlorosulfonated polyolefins having average molecular weights in the range of 50,000 to 300,000 are most suitable for preparation of polyurethanes or polyureas for adhesive and thermoset applications, with the preferred average molecular weight being 75,000 to 150,000.

The chlorosulfonated olefin polymers used to prepare the resins of the invention may be prepared by reacting an alpha monoolefin polymer with a chlorosulfonating agent at temperatures of about 80°-100° C., usually in the presence of a free radical initiator and an inert solvent. A typical chlorosulfonating agent is sulfonyl chloride and a typical initiator is 2,2'-azobis(2-methylpropane nitrile). Various chlorosulfonated olefin polymers and methods for their preparation are discussed, for example, in U.S. Pat. Nos. 2,586,363, and 3,296,222 which are incorporated herein by reference.

The polyols used in the present invention have equivalent weights up to about 5,000 and have at least two hydroxyl groups per molecule. They can be selected from the classes of polyols based on polyester, polyacrylic, or polyether resins or they may be polyhydric alcohols. The polyether polyols are prepared by known methods by the reaction of aliphatic diols and triols, such as ethylene glycol, propylene glycol, trimethylolpropane and the like with a polyhydric initiator. The polyester polyols used in the present invention can be formed by reacting a polycarboxylic acid with a polyhydric compound, such as a diol or triol. The polycarboxylic acids include adipic acid, glutaric acid, succinic acid, pimelic acid, oxalic acid, malonic acid, suberic acid, azelaic acid, maleic acid and the like. The polyhydric alcohols include various diols and triols such as ethylene glycol, 1,2-propylene glycol, 1,3-propylene glycol, butanediols, pentanediols, trimethylolpropane and the like. The polyacrylic polyols can be formed by the reaction of polyacrylic acids with various diols and triols such as ethylene glycol, 1,2-propylene glycol, 1,3-propylene glycol, butanediols, pentanediols, trimethylolpropane and the like.

The term polyamine as used herein means those hydrophobic aliphatic, cycloaliphatic and aromatic hydrocarbons having two or more primary or secondary amino functionalities per molecule. This class of hydrocarbon primary and secondary polyamines can be generically represented by the following formulas:

NHR-R'-NHR, and $R_xN(R'-NHR)_y$ where
R is hydrogen or an aliphatic, cycloaliphatic, or aromatic hydrocarbon group,
R' is an aliphatic, cycloaliphatic, or aromatic hydrocarbon group,
$x = 0-2$,
$y = 1-3$, and
$x + y = 3$.

In addition the polyamines may be cyclic saturated polyamino hydrocarbons of the formula $NH(R'')_2NH$ where
R'' is a hydrocarbon group.

The term polyamine as used herein also encompasses those polyamines which are formed by condensation reactions of the aliphatic, cycloaliphatic, or aromatic polyamino hydrocarbons encompassed by the above generic formulas with aliphatic or aromatic polycarboxylic acids. The term as used herein also encompasses those polyamines which have at least two primary or secondary amino moieties and which are formed by condensation reactions of aliphatic or aromatic amines having two or more primary or secondary amino functionalities per molecule with aliphatic or aromatic polycarboxylic acids. Examples of polyamines that can be used to prepare the resin compositions of the present invention include, among others, isophoronediamine, hexamethylenediamine, ethylenediamine, 1,4-cyclohexanebis(methylamine), 1,2-diaminopropane, propylenediamine, trimethylhexamethylmethylenediamine, methanediamine, 4,4'-methylenebisaniline, triethylenetetramine, diethylaminopropylamine, diethylenetriamine, and N-aminoethylpiperazine. The preferred polyamine is isophoronediamine. Polyamine condensation products that can be described by the above generic formulas are condensation products of polyamines with aliphatic or aromatic polycarboxylic acids, such as adipic, azelaic, phthalic, isophthalic and succinic. The preferred condensation products are reaction products of isophoronediamine, hexamethylenediamine, ethylenediamine, 1,4-cyclohexanebis(methylamine), 1,2-diaminopropane, propylenediamine, trimethylhexamethylmethylenediamine, methanediamine, 4,4'-methylenebisaniline, triethylenetetramine, diethylaminopropylamine, diethylenetriamine, and N-aminoethylpiperazine.

The polyisocyanates used in the present invention include monomeric polyisocyanates, such as toluene diisocyanate, ethylene diisocyanate, propylene diisocyanate, meta and para-phenylene diisocyanates, diphenylmethane 4,4'-diisocyanate, hexamethylene diisocyanate, isophorone diisocyanate, bis(4-isocyanatocyclohexyl)methane, and the like. Polymeric isocyanates can also be used in the present invention, such as those derived from the reaction of toluene diisocyanate and trimethylolpropane. The particular polyisocyanate employed is not critical, but diisocyanates are preferred, and of these the trimers of toluene diisocyanate and of hexamethylene diisocyanate are preferred.

The substantially hydrophobic resins are prepared by the general procedure of contacting the chlorosulfonated olefin polymer and an amount of polyol, polyamine, or mixture thereof with a polyisocyanate. The preparation may be carried out at ambient temperatures and pressures or at elevated temperatures and pressure, and one skilled in the art will be able to adjust the reaction conditions to control the rate of reaction through routine experimentation. The number of equivalents of polyol or polyamine must be greater than the number of equivalents of sulfur present in the chlorosulfonated olefin polymer. This insures that free hydroxylic or amino groups are present to react further with polyisocyanate to form the polyurethane or polyurea resin product. The amount of polyisocyanate added is consequently based on the number of equivalents of polyol or polyamine present minus the number of equivalents of sulfur present in the chlorosulfonated olefin polymer. The actual equivalent amount of the polyisocyanate can vary based on the type of polyisocyanate used and the known fact that many polyisocyanates react readily with water in the atmosphere, thus removing some of the polyisocyanate from availability for reaction with the hydroxy or amine functionalities. However, it has been found that at least 5% by weight, based on the weight of the total composition, of the polyisocyanate must be present in order to form the chlorosulfonated olefin polymer compostions of the invention. The amount of chlorosulfonated olefin polymer present in the reactive composition can be as low as 5 % by weight to accommodate polyols or polyamines having high molecular weights. Conversely, the amount of chlorosulfonated olefin polymer present can be as high as 80 weight % when high molecular weight polyolefins are utilized, since fewer sulfonyl chloride groups are required to assure at least two sulfur groups per molecule. For the same reasons the amount of polyol or polyamine present in the reactive composition ranges from 5-90% by weight wherein the equivalent ratio of the polyol, or polyamine to sulfur in the chlorosulfonated olefin polymer is greater than 1:1. This insures that there are free hydroxyl or amino groups available for further reaction with the polyisocyanate. Similarly, there must be a sufficient number of isocyanate moieties present to react with the free hydroxyl or amino groups present in the sulfonate or sulfonamide derivative formed by reaction of the chlorosulfonated olefin polymer with polyol or polyamine. Depending on the molecular weights of the polyisocyanate, polyol or polyamine, and the chlorosulfonated olefin polymer this amount will be at least 5% by weight, based on the weight of the resin, and will generally fall within the range of 5-90 % by weight of the total composition.

The chlorosulfonated olefin polymer, polyol, polyamine, or mixture thereof, and the polyisocyanate may be contacted simultaneously to produce a reactive composition which then reacts to form the product polyurethanes or polyureas of the invention. When a polyol alone is used, it is preferred that a tertiary amine be present in amounts of 0.1-2 equivalents per equivalent of sulfur present in the chlorosulfonated olefin polymer, to act as an acid scavenger. The use of a tertiary amine is optional when polyamines or mixtures of polyols and polyamines are used as reactants. The process may be run in the absence or in the presence of an inert solvent such as toluene, xylene, methyl ethyl ketone, or methyl isobutyl ketone, or in the melt at elevated temperatures. The viscosity of the reaction mixture will detemine whether a solvent or elevated temperature is necessary or desirable. The tertiary amine component may function as an acid acceptor for the reaction between the chlorosulfonated olefin polymer and the polyol and as the catalyst for the reaction between the polyol or polyamine and polyisocyanate. Tertiary amines which are preferred for the present invention must be compounds or mixtures of compounds which have a Kb of at least $2 \times 10^{-9}$. Suitable tertiary amines include such compounds as trimethylamine, triethylamine, tributylamine, N-methylmorpholine, N-ethylmorpholine, N-cocomorpholine, and 1,4-diazabicyclo-(2,2,2)octane. The preferred tertiary amines used in the present invention are triethylamine and tributylamine.

In another preferred embodiment of the process of the invention, the polyurethane or polyurea compositions may be prepared by first reacting the chlorosulfonated olefin polymer with excess polyol, polyamine, or mixtures thereof to produce a mixture of an intermediate sulfonate or sulfonamide derivative and polyol or polyamine. The mixture is then subsequently reacted with a polyisocyanate to form the final polyurethane or polyurea. In this embodiment 10-80% by weight of the chlorosulfonated olefin polymer, based on the total weight of the composition, is reacted with 5-90% by weight of the polyol, polyamine, or mixture thereof, based on the total weight of the composition, wherein the equivalent ratio of the polyol or polyamine to sulfur in the chlorosulfonated olefin polymer is greater than 1:1. The sulfonate or sulfonamide derivative formed is then combined with at least 5% by weight of a polyisocyanate, based on the weight of the total composition, generally 5-90% by weight, based on the weight of the total composition. The amount is selected to correspond to an amount of polyisocyanate about equal to the equivalents of the polyol or polyamine minus the equivalents of the sulfur contained in the chlorosulfonated olefin polymer. When polyurethanes are prepared using this embodiment it is preferable that 0.1-2 equivalents of a tertiary amine per equivalent of sulfur present in the chlorosulfonated olefin, be present during the initial reaction, to act as an acid scavenger. However, when polyamines or mixtures of polyols and polyamines are used to prepare polyureas or mixed polyurethane-polyureas, a tertiary amine need not be present.

In a further embodiment of the invention a portion of the chlorosulfonyl groups present in the chlorosulfonated olefin polymer may be pre-reacted with a derivatizing agent prior to reaction with the polyol or polyamine and the polyisocyanate. Compounds useful for this purpose are primary and secondary monoamines and monohydric alcohols. The primary and secondary amines can be chosen from the classes of aliphatic, alicyclic, and aromatic amines which include methylamine, ethylamine, propylamine, aniline, ethanolamine, diethanolamine, N-methylethanolamine, and the like. The monofunctional alcohol derivatizing agents that can be used can include any aliphatic, alicyclic, or aromatic monofunctional alcohol, such as, for example, methanol, ethanol, isopropanol, octanol, benzyl alcohol, or cyclohexanol. Generally, about 0.1 to about 1 equivalents of derivatizing agent are used per equivalent of sulfur present in the chlorosulfonated olefin polymer. Following reaction of the derivatizing agent with the chlorosulfonated olefin polymer, the resultant composition is further reacted via a combination of substitution and transesterification or transamidation with 5-90% by weight, based on the weight of the total composition, of one of the above-described polyols or polyamines, or mixtures thereof, and at least 5% by weight, generally 5-90% by weight, based on the weight of the total composition of one of the above-described polyisocyanates to form a resin composition of the invention. In cases where a polyol alone rather than a mixture of polyol and polyamine, is present with the polyisocyanate for the final reaction 0.1-2 equivalents, per equivalent of sulfur present in the chlorosulfonated olefin polymer of a tertiary amine is additionally present. The use of a tertiary amine is optional in cases where a polyamine or polyol/polyamine mixture is used in the final reaction. Monohydric alcohols may be used in excess in this embodiment to act both as derivatizing agents and as solvents. In this case the reaction of the chlorosulfonated olefin polymer derivative with polyol or polyamine is totally by transesterification or transamidation.

The compositions of the invention are useful for forming coating compositions, adhesives, thermoset resins, membranes, and reaction injection molded parts.

EXAMPLES

The examples which follow are submitted to illustrate and not to limit this invention. All parts and percentages are on a weight basis unless otherwise indicated.

COMPARATIVE EXAMPLE 1

This example illustrates the effect of preparing a polyurethane resin composition in the absence of a chlorosulfonated olefin polymer. 100 g (0.30 equivalents) of a polyester polyol resin (Desmophen ®651 alkyd resin, available from Mobay Chemical Co.) having an equivalent weight of 330, was combined with 4 g of methyl ethyl ketone and 5 g of tributylamine. The mixture was stirred for 15 minutes and then 65.5 g (0.30 equivalents) of a trimer of hexamethylene diisocyanate (Desmodur ® N3390 isocyanate, available from Mobay Chemical Co.) having an equivalent weight of 216 was added with agitation. Over the next 2 hours the viscosity of the solution increased from 220 centipoise to 460 centipoise. At this point, several 20 mil draw-downs were made onto Teflon ® fluorocarbon resin film. The coatings were allowed to dry and cure at room temperature for a minimum of 7 days. After this time a film sample was extracted with acetone in a Soxhlet extractor for a minimum of 4 hours to determine the weight percent insolubles, which was found to be 79%. The composition of this example, which did not contain a chlorosulfonated olefin polymer, produced a film which was undesirably hard and brittle.

COMPARATIVE EXAMPLE 2

This example illustrates the effect of preparing a polyurethane resin in the presence of a chlorinated olefin polymer, rather than in the presence of a chlorosulfonated olefin polymer. 100 g of a 60.2% solids solution of chlorinated polyethylene (Cl content 36.4%) in toluene was diluted with 100 g of methyl ethyl ketone. To this solution were added 92.6 g (0.28 equivalents) of a polyester polyol resin (Desmophen ® 651 alkyd resin, available from Mobay Chemical Co.) having an equivalent weight of 330 and 9.0 g of tributylamine. The mixture was stirred for several hours and then 60.2 g (0.28 equivalents) of a trimer of hexamethylene diisocyanate (Desmodur ® N3390 isocyanate, available from Mobay Chemical Co.) having an equivalent weight of 216 was added. The viscosity was allowed to increase and then several 20 mil draw-downs were made onto Teflon® fluorocarbon resin film. The coatings were allowed to dry and cure at room temperature for a minimum of 7 days. After this time a film sample was extracted with acetone in a Soxhlet extractor for a minimum of 4 hours to determine the weight percent insolubles. The % insolubles, 47.0%, indicated that essentially all of the low molecular weight chlorinated polyolefin had been extracted out of the crosslinked urethane composition.

EXAMPLE 3

100 g of a 30.5% solids solution of chlorosulfonated polyethylene [chlorine content 44.9%, sulfur content 2.5%, prepared from a polyethylene base resin having a number average molecular weight of 5,000 (AC-6® polyethylene, available from Allied-Signal Corp.)] (0.024 equivalents sulfur) in toluene was diluted with 100 g of methyl ethyl ketone. To this solution was added 109 g (0.33 equivalents) of a polyester polyol resin (Desmophen® 651 alkyd resin, available from Mobay Chemical Co.) having an equivalent weight of 330 and 5 g (0.03 equivalents) of tributylamine. The mixture was stirred for several hours and then 66.7 g (0.31 equivalents) of a trimer of hexamethylene diisocyanate (Desmodur® N3390 isocyanate, available from Mobay Chemical Co.) having an equivalent weight of 216 was added. The viscosity was allowed to increase and then several 20 mil draw-downs were made onto Teflon® fluorocarbon resin film. The coatings were allowed to dry and cure at room temperature for a minimum of 7 days. After this time a film sample was extracted with acetone in a Soxhlet extractor for a minimum of 4 hours to determine the weight percent insolubles. The % insolubles, 95.7%, indicated that the chlorosulfonated olefin polymer had been incorporated into the polyurethane resin product.

EXAMPLE 4

100 g of a 30.5% solids solution of chlorosulfonated polyethylene [chlorine content 44.9%, sulfur content 2.5%, prepared from a polyethylene base resin having a number average molecular weight of 5,000 [AC-6® polyethylene, available from Allied-Signal Corp.)] (0.024 equivalents sulfur) was diluted with 100 g of methyl ethyl ketone. To this solution was added 94 g (0.28 equivalents) of of a polyester polyol resin (Desmophen® 651 alkyd resin, available from Mobay Chemical Co.) having an equivalent weight of 330 and 5 g (0.03 equivalents) of tributylamine. The mixture was stirred for several hours and then 51 g (0.24 equivalents) of a trimer of hexamethylene diisocyanate (Desmodur® N3390 isocyanate, available from Mobay Chemical Co.) having an equivalent weight of 216 was added. The viscosity was allowed to increase and then several 20 mil draw-downs were made onto Teflon® fluorocarbon resin film. The coatings were allowed to dry and cure at room temperature for a minimum of 7 days. After this time a film sample was extracted with acetone in a Soxhlet extractor for a minimum of 4 hours to determine the weight percent insolubles. The % insolubles, 84.9%, indicated that the chlorosulfonated olefin polymer had been incorporated into the polyurethane resin product.

EXAMPLE 5

100 g of an 81.1% solids solution of chlorosulfonated polyethylene [chlorine content 31.5%, sulfur content 1.7%, prepared from a polyethylene base resin having a number average molecular weight of 5,000 (AC-6 polyethylene, available from Allied-Signal Corp.)] (0.043 equivalents sulfur) in toluene was diluted with 100 g of methyl ethyl ketone. To this solution was added 53.5 g (0.16 equivalents) of a polyester polyol resin (Desmophen®651 alkyd resin, available from Mobay Chemical Co.) having an equivalent weight of 330 and 8.7 g (0.05 equivalents) of tributylamine. The mixture was stirred for several hours and then 66.7 g (0.31 equivalents) of a trimer of hexamethylene diisocyanate (Desmodur® N3390 isocyanate, available from Mobay Chemical Co.) having an equivalent weight of 216 was added. The viscosity was allowed to increase and then several 20 mil draw-downs were made onto Teflon® fluorocarbon resin film. The coatings were allowed to dry and cure at room temperature for a minimum of 7 days. After this time a film sample was extracted with acetone in a Soxhlet extractor for a minimum of 4 hours to determine the weight percent insolubles. The % insolubles, 66.7%, indicated that the chlorosulfonated polyolefin resin had been incorporated into the polyurethane resin product.

EXAMPLE 6

100 g of a 61 weight % solids solution of chlorosulfonated polyethylene [chlorine content 44.9%, sulfur content 2.5%, prepared from a polyethylene base resin having a number average molecular weight of 5,000 [AC-6® polyethylene, available from Allied-Signal Corp.], (0.048 equivalents sulfur) was mixed with 100 g of methyl ethyl ketone, 94 g (0.28 equivalents) of a polyester polyol resin (Desmophen® 651 alkyd resin, available from Mobay Chemical Co.) having an equivalent weight of 330 and 2.9 g (0.048 equivalents) of isopropyl alcohol. The mixture was stirred and 9.9 g (0.05 equivalents) of tributylamine was added. After the addition of the tributylamine the viscosity slowly increased from 68 centipoise to 550 centipoise. The mixture was allowed to stir at room temperature. 51.3 g (0.23 equivalents) of a trimer of hexamethylene diisocyanate (Desmodur® N3390 isocyanate, available from Mobay Chemical Co.) having an equivalent weight of 216 was added and the viscosity monitored. When the viscosity had increased from 330 centipoise to 900 centipoise several 20 mil draw-downs were made onto Teflon® fluorocarbon resin film. The coatings were allowed to dry and cure at room temperature for a minimum of 7 days. After this time a film sample was extracted with acetone in a Soxhlet extractor for a minimum of 4 hours to determine the weight percent insolubles, which were found to be 93%.

EXAMPLE 7

100 g of a 48 weight % solution of chlorosulfonated polyethylene (chlorine content 44.6%, sulfur content 4.8%, prepared from a polyethylene base resin having a number average molecular weight of 30,000 (C-10® polyethylene, available from Eastman Chemical Co.)], (0.0615 equivalents sulfur) in toluene was mixed with 70 g of methyl ethyl ketone, 3.6 g (0.062 equivalents) isopropyl alcohol and 12.8 g (0.065 equivalents) tributylamine. The mixture was stirred at room temperature for one hour to allow for the complete formation of the isopropyl sulfonate. 63.1 g (0.191 equivalents) of a polyester polyol resin (Desmophen ® 651 alkyd resin, available from Mobay Chemical Co.) having an equivalent weight of 330 and 27.9 g (0.13 equivalents) of a trimer of hexamethylene diisocyanate (Desmodur ® N3390 isocyanate, available from Mobay Chemical Co.) having an equivalent weight of 216 were added with stirring. When the viscosity had increased to more than twice the initial value several 20 mil draw-downs were made onto Teflon ® fluorocarbon resin film. The coatings were allowed to dry and cure at room temperature for a minimum of 7 days. After this time a film sample was extracted with acetone in a Soxhlet extractor for a minimum of 4 hours to determine the weight percent insolubles. The value of 76.3% insolubles obtained demonstrates that the chlorosulfonated polyolefin was incorporated into the cured composition, in spite of the fact that the sulfonyl chloride group had been converted to the isopropyl ester.

EXAMPLE 8

73.3 g of a polyester polyol (Desmophen ® 651 alkyd resin, available from Mobay Chemical Co.) having an equivalent weight of 330 (0.222 equivalents), 6.8 g tributylamine (0.037 equivalents) and 50 g of methyl isobutyl ketone were mixed in a 250 ml beaker. 50 g of a 43 weight % solids solution of chlorosulfonated polyethylene [chlorine content 42.9%, sulfur content 5.3% , prepared from a polyethylene base resin having a number average molecular weight of 30,000 (C-10 ® polyethylene, available from Eastman Chemical Co.)],(0.036 equivalents sulfur) in toluene was added slowly to the above mixture over a period of 5-10 minutes. After the addition of the chlorosulfonated polyolefin was complete, 55.7 g of a trimer of hexamethylene diisocyanate (Desmodur ® N3390 isocyanate, available from Mobay Chemical Co.) having an equivalent weight of 216 (0.26 equivalent) was added rapidly with vigorous stirring. The mixture was allowed to stand at room temperature while the viscosity was monitored. When the viscosity had exceeded 750 centipoise several 20 mil draw-downs were made onto Teflon ® fluorocarbon resin films. The films were allowed to dry and cure at room temperature for a minimum of 7 days. After this time a film sample was extracted for a minimum of 4 hours with acetone and the weight percent insolubles was determined to be 89% indicating that the chlorosulfonated olefin polymer was incorporated into the polyurethane resin product.

EXAMPLE 9

50 g of a 65 weight percent solids solution of chlorosulfonated polyethylene [chlorine content 44.9%, sulfur content 2.5%, prepared from a polyethylene base resin having a number average molecular weight of 5,000 (AC-6 ® polyethylene, available from Allied-Signal Corp.)] (0.025 equivalents sulfur) in toluene was mixed with 30 g of methyl ethyl ketone, 1.5 grams of isopropanol (0.025 equivalents) and 4.6 g of tributylamine (0.025 equivalents). The mixture was stirred and allowed to react for a minimum of 15 minutes. Then, 36.1 g of a trimer of hexamethylene diisocyanate (Desmodur ® N3390 isocyanate, available from Mobay Chemical Co.) having an equivalent weight of 216 (0.167 equivalents) was added with stirring. There was no detectable increase in viscosity. 10.2 g of isophoronediamine (0.128 equivalents) was added with vigorous stirring. There was an immediate and continual increase in the viscosity of the mixture. A fully crosslinked, polyurea thermoset resin was obtained.

EXAMPLE 10

50 g of a 65 weight percent solids solution of a chlorosulfonated polyolefin [chlorine content 44.9%, sulfur content 2.5% prepared from a polyethylene base resin having a number average molecular weight of 5,000 (AC-6 ® polyethylene, available from Allied-Signal Corp.)] (0.025 equivalents sulfur) in toluene was mixed with 20 g of methyl ethyl ketone, and 36.1 g of a trimer of hexamethylene diisocyanate (Desmodur ® N3390 isocyanate, available from Mobay Chemical Co.) having an equivalent weight of 216 (0.167 equivalents) was added with stirring. There was no detectable increase in viscosity. A mixture of 19.2 g of an aliphatic polyamine resin [Versamide ® 150, available from Henkel Chemical Co. having an equivalent weight of 102 (0.188 equivalents), 10 g of methyl ethyl ketone and 1.5 g of isopropanol (0.025 equivalents) were added with vigorous stirring. There was an immediate and continual increase in the viscosity of the mixture. A fully crosslinked, intractable polyurea resin was obtained.

EXAMPLE 11

50 g of a 75% solids solution of chlorosulfonated ethylene/vinyl acetate copolymer [melt index 2500, chlorine content 39.2%, sulfur content 3.08%,], (0.039 equivalents sulfur) was mixed with 30 g methyl ethyl ketone, 63.6 g (0.193 equivalents) of a polyester polyol (Desmophen ® 651 alkyd resin, available from Mobay Chemical Co.) having an equivalent weight of 330, and 7.22g of tributylamine (0.039 equivalents). The mixture was stirred for 15 minutes. Then 41.7 g (0.417 equivalents) of a trimer of hexamethylene diisocyanate (Desmodur ® N3390 isocyanate, available from Mobay Chemical Co.) having an equivalent weight of 216 was added with stirring. When the viscosity of the mixture had increased to greater than 500 centipoise, several 20 mil draw-downs were made onto Teflon ® fluorocarbon resin film. The draw-downs were allowed to dry and cure at room temperature for a minimum of 7 days. After this time the film samples were removed from the Teflon ® fluorocarbon resin films and extracted with methyl ethyl ketone in a soxhlet extractor for a minimum of 4 hours. The percent insoluble material was determined to be 78.1%.

I claim:

1. A substantially hydrophobic chlorosulfonated olefin polymer resin composition comprising the reaction product of:
   a) 10-80% by weight, based on the weight of the resin, of a chlorosulfonated olefin polymer having a chlorine content of about 20-60% by weight and a sulfur content of 0.5-10% by weight;
   b) 5-90% by weight, based on the weight of the resin, of a compound selected from the group consisting of polyols, hydrocarbon primary or secondary polyamines, and condensation products of said polyamines with aliphatic, cycloaliphatic, or aromatic polycarboxylic acids, and mixtures thereof, wherein the equivalent ratio of the compound to sulfur present in the chlorosulfonated olefin polymer is greater than 1:1, and the compound has an equivalent weight up to 5,000; and with
   c) at least 5% by weight, based on the weight of the resin, of a polyisocyanate.

2. The resin composition of claim 1, wherein the chlorosulfonated olefin polymer is selected from the group consisting of chlorosulfonated hompolymers of $C_2$–$C_8$ alpha monoolefins, chlorosulfonated copolymers of ethylene with carbon monoxide, and chlorosulfonated copolymers of ethylene and at least one ethylenically unsaturated monomer selected from the group consisting of $C_3$–$C_{10}$ alpha monoolefins, $C_1$–$C_{12}$ alkyl esters of unsaturated $C_3$–$C_{20}$ monocarboxylic acids, unsaturated $C_3$–$C_{20}$ mono- or dicarboxylic acids, and vinyl esters of saturated $C_2$–$C_{18}$ carboxylic acids.

3. The resin composition of claim 1, wherein the chlorosulfonated olefin polymer is selected from the group consisting of chlorosulfonated polyethylene, chlorosulfonated polypropylene, chlorosulfonated ethylene vinyl acetate copolymers, chlorosulfonated ethylene acrylic acid copolymers, chlorosulfonated ethylene methacrylic acid copolymers, chlorosulfonated ethylene methyl acrylate copolymers, chlorosulfonated ethylene methyl methacrylate copolymers, chlorosulfonated ethylene n-butyl methacrylate copolymers, chlorosulfonated ethylene glycidyl methacrylate copolymers; and chlorosulfonated ethylene copolymers of ethylene with propylene, butene, 3-methyl-1-pentene or octene.

4. The resin composition of claim 1 wherein the chlorosulfonated olefin polymer is chlorosulfonated polyethylene.

5. The resin composition of claim 1 wherein the chlorosulfonated polyolefin is a chlorosulfonated ethylene vinyl acetate copolymer.

6. The resin composition of claim 1, wherein the chlorosulfonated olefin polymer has a chlorine content of about 30–50% and a sulfur content of about 1–3%.

7. The resin composition of claim 1, wherein the chlorosulfonated olefin polymer has an average molecular weight of 1,000–50,000.

8. The resin composition of claim 1, wherein the polyol is selected from the group consisting of polyester polyols, polyether polyols, polyacrylic polyols, and mixtures thereof.

9. The resin composition of claim 1 wherein the polyamine is isophoronediamine.

10. The resin composition of claim 1 wherein the polyamine is the reaction product of a hydrocarbon primary or secondary polyamine with a compound selected from the group consisting of aliphatic polycarboxylic acids, cycloaliphatic polycarboxylic acids, and aromatic polycarboxylic acids.

11. The resin composition of claim 1 wherein the hydrocarbon primary or secondary polyamine is a compound having the structure $$NHR\text{-}R'\text{-}NHR, \text{ or}$$

$$R_xN(R'\text{-}NHR)_y$$

where
R is hydrogen or an aliphatic, cycloaliphatic, or aromatic hydrocarbon group,
R' is an aliphatic, cycloaliphatic, or aromatic hydrocarbon group,
$x = 0-2$,
$y = 1-3$, and
$x + y = 3$.

12. The resin composition of claim 1 wherein the hydrocarbon primary or secondary polyamine is a saturated cyclic polyamino hydrocarbon of the formula $$NH(R'')_2NH$$

where
R" is a hydrocarbon group.

* * * * *